Sept. 18, 1956 D. RAMSAY ET AL 2,763,193
HANDLE AND TILLAGE DEPTH CONTROL MEANS
FOR ROTARY HOE CULTIVATORS
Filed Dec. 23, 1952 3 Sheets-Sheet 1
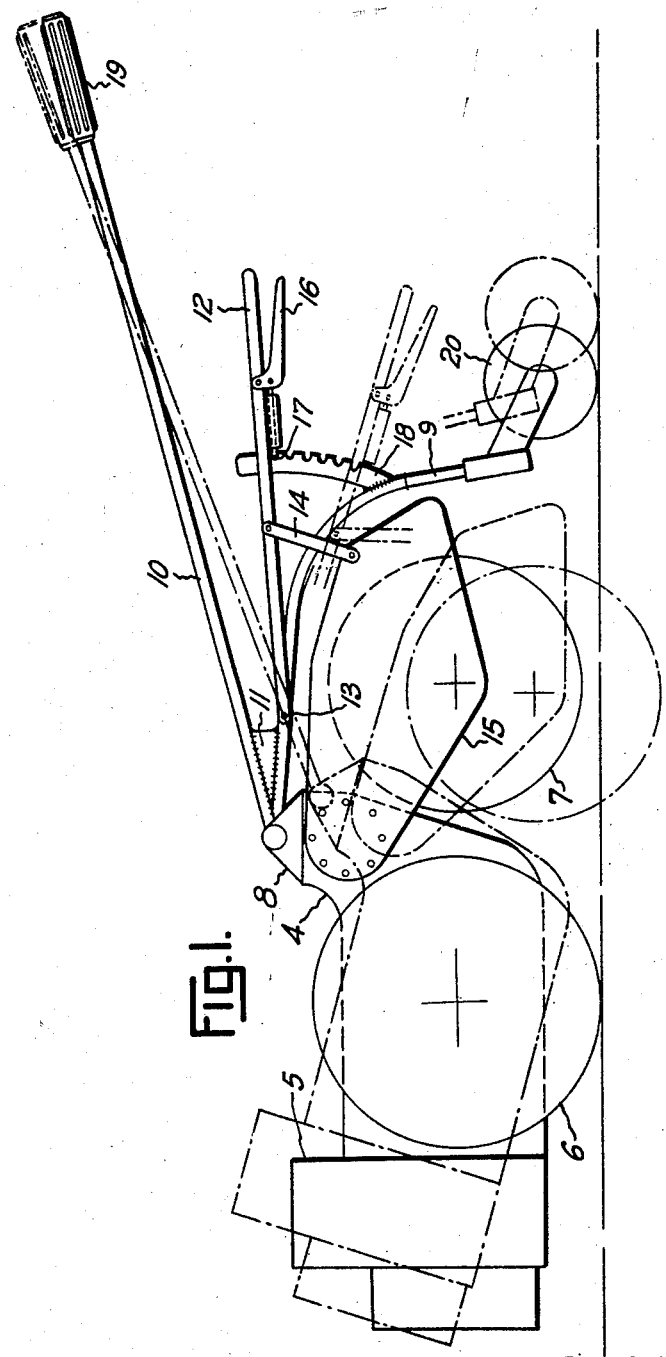
DUNCAN RAMSAY
AND
RICHARD McDONNELL
INVENTORS
By Jewett, Mead, Browne & Schuyler
ATTORNEYS

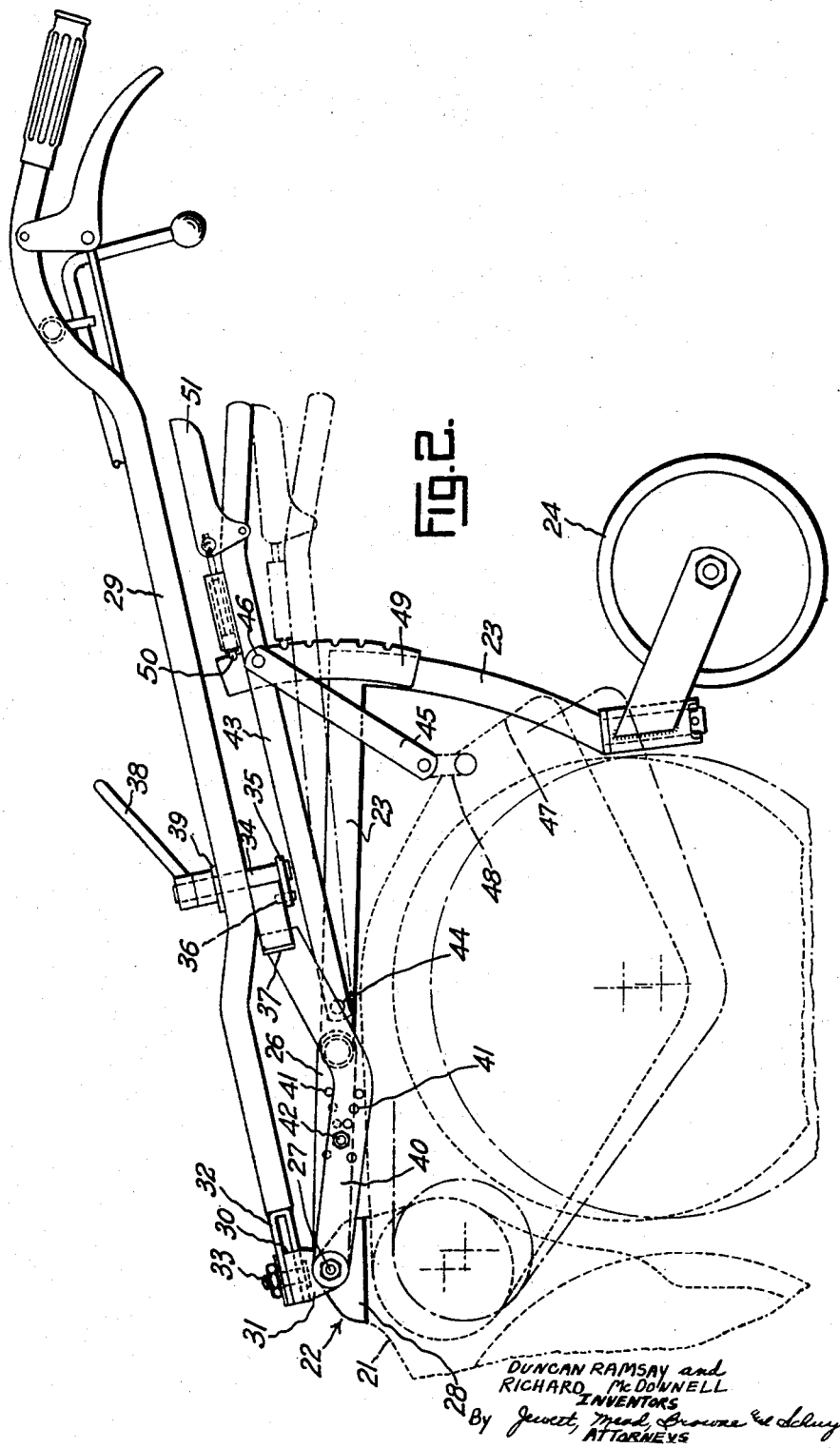

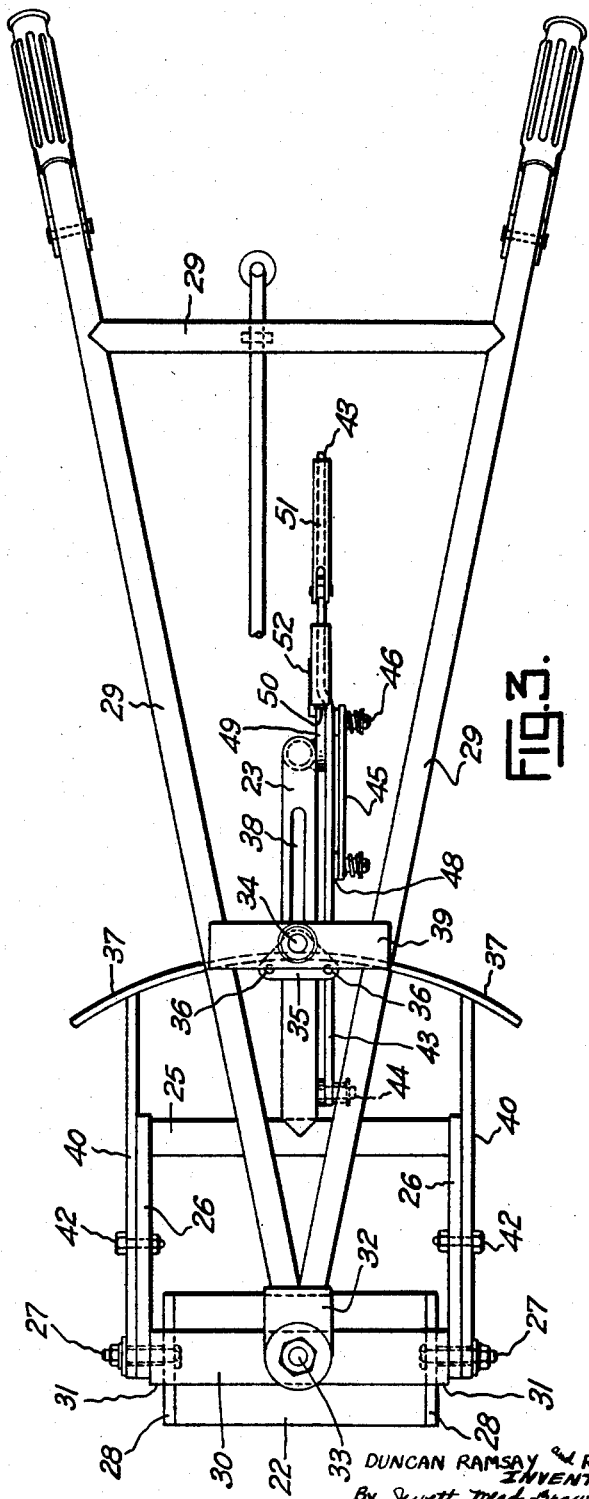

United States Patent Office 2,763,193
Patented Sept. 18, 1956

2,763,193

HANDLE AND TILLAGE DEPTH CONTROL MEANS FOR ROTARY HOE CULTIVATORS

Duncan Ramsay, Pymble, New South Wales, and Richard McDonnell, Galston, New South Wales, Australia, assignors to Howard Auto-Cultivators Limited, Northmead, New South Wales, Australia Application December 23, 1952, Serial No. 327,504

Claims priority, application Australia January 4, 1952

8 Claims. (Cl. 97—47.01)

This invention relates to automotive rotary hoe cultivators of the kind comprising a chassis or frame which carries an engine for rotating a pair of forward drive wheels and a hoe rotor borne on the frame behind the drive wheels. Such cultivators, at the rearward end of the frame, carry an operator's handle which is usually in the form of a twin-branched handle bar. Between the handle bar and the hoe rotor there is usually provided a rear support and tillage depth adjustment column which on its lower end is furnished with a caster wheel or earth skid. At its upper end the column is joined to a depth adjustment lever fulcrumed on the frame and furnished with an operating handpiece with which there is associated pawl and notched quadrant or other devices for maintaining selected adjustment of the tillage depth adjustment column.

Rotary hoe cultivators of the known kind referred to above are efficient in most respects, but they display a marked disability in that adjustment of the mentioned column for greater tillage depth causes the rear end of the frame to be correspondingly lowered, and therefore causes a corresponding lowering of the handle bar. This is no great inconvenience where tillage depth adjustment is not appreciable, but it will be clear that because the frame as a whole pivots about the front drive wheel axis when the tillage depth is varied, variation of that depth by only a few inches angularly multiplies the corresponding raising or lowering of the handle bar. Where the tillage depth increase is appreciable, the handle bar is lowered to such an extent as to render the machine extremely tiring for the user and unwieldy to a degree which seriously impairs efficiency of operation.

It is true that the existing handle bar is itself height adjustable by being mounted upon a column which is slidable within a sleeve or socket on the frame and is adapted to be held in any selected height adjustment by tightening a set screw or the like upon the column; but that adjustment of the handle bar is time consuming and where fairly frequent alternations of the tillage depth are required, the height adjustment of the handle bar to suit each varying condition becomes impracticable. The existing height adjustment for the handle bar is really intended only as a means of initially suiting the handle bar elevation to the average elevation which a user may require.

The object of this invention is to overcome the stated disability in a particularly simple manner by the provision of handle and tillage depth adjustment means in which, quite irrespective of the extent to which tillage depth may be varied, the handle bar of the machine remains at substantially constant elevation relative to the ground, or is even slightly elevated when tillage depth is increased, to compensate for the tendency on the part of the machine as a whole, or its rear end support, to sink somewhat below the normal working level owing to deep tillage causing a greater breaking up or softening of the earth in which the rear support is required to run.

An example of the invention is illustrated in the drawings herewith.

Figure 1 is a schematic side elevation of a rotary hoe incorporating the invention. In this figure the full lines show the machine parts in transport position; that is, with the hoe rotor clear of the ground; and the chain dotted lines show the parts in maximum tillage depth position.

Figure 2 is a side elevation (on a somewhat larger scale than that of Figure 1) of a practical embodiment of the invention, existing parts (not of the substance of the invention) being shown in dotted lines, and an alternative position of the parts being shown in chain dotted lines.

Figure 3 is a plan projected from Figure 2, certain parts being omitted for clearness.

Referring to Figure 1, the machine frame 4 carries an engine 5 and is supported on a pair of front drive wheels 6. (The expression "frame" as used herein is intended to include the machine chassis or any machine part mounted thereon or otherwise fixedly at one therewith.) The frame also carries the hoe rotor 7 and means for driving it from the engine. The above parts numbered 4 to 7 may be of conventional design.

The frame carries a fulcrum bracket 8 to which the rear support boom 9 and the handle bar 10 are fulcrumed about one and the same axis. This axis is disposed horizontally and transversely of the machine. Means are provided for holding the boom and the handle bar in fixed angular relationship. These holding means may consist in no more than a gusset or the like (11) fixed by welding or otherwise to both the boom and the handle-bar. For preference, however, the holding means allows angular adjustment between the boom and the handle-bar as referred to later herein. A tillage depth adjustment lever 12 is pivoted to the boom as indicated at 13. A link 14 is pivotally connected at its ends to the boom and to any convenient part of the machine frame; in this instance, a fixedly mounted rotor cover guard 15. The means for holding the lever 12 and the boom 9 in selected angular adjustment may be of more-or-less conventional type; for example, grip lever 16 and spring-loaded pawl or plunger 17, on the lever 12, and a notched quadrant bar 18 fixed on the boom 9.

In use, a change in tillage depth is effected simply by changing the position of the lever 12 relative to the quadrant bar 18. When such changes are made the height of the handpieces (19) from the ground remains substantially constant, the slight apparent rise of said handpieces (which is indicated by the dotted representation thereof in Figure 1) being negatived or largely negatived by the fact that when the hoe rotor is on deep tillage (as shown by the dotted lines in Figure 1) the rear end of the boom 9 (provided with a wheel such as 20 or an earth skid or the like) tends to sink somewhat below ground level owing to the greater earth breakage.

Referring to Figures 2 and 3, the machine frame 21 (not shown in Figure 3) has a U-shaped fulcrum bracket 22 fixed thereon. The rear support boom consists of a main rear portion 23 fitted with a caster wheel 24 (or a skid or the like) at its lower end, and at its forward and upper end is fixed to a cross bar 25 having its ends fixed to a pair of arms 26. These arms 26 are pivotally mounted on fulcrum pins 27 which extend through the side wings 28 of the fulcrum bracket 22.

The handle bar 29 has its forward end secured to the web 30 of an inverted U-sectioned bracket (or second fulcrum bracket) having side wings 31 pivotally mounted upon the fulcrum pins 27.

As previously indicated herein, the means for holding the boom and the handle bar in fixed angular relationship are preferably such as will enable that relationship to be selectively varied as may be required. This angular adjustability is preferably in two directions, namely; in a vertical plane so that an initial handle height may be established to suit a particular user, and laterally to enable the user's hand thrust to be applied obliquely as is sometimes required when, for example, the operator should walk to one side of the machine to avoid walking on the cultivated earth where the cultivator has passed. Either of these forms of adjustability may be included in the absence of the other, but preferably both are present as in the embodiment of the invention shown by Figures 2 and 3.

In that embodiment the connection between the handle bar 29 and the bracket web 30 is by way of a U-piece 32 which is fixed on the handle bar and has its limbs embracing the web 30 and is pivotally connected thereto by a pivot pin 33. This connection allows the handle bar to be swung laterally of the machine. To retain selected lateral adjustment of the handle bar, it is provided with a clamping bolt 34 whereof the head 35 has a pair of pegs 36 able to hook about the lower edge of an arcuate rail 37. The clamping bolt has a clamping nut 38 able to tighten against an abutment plate 39 fixed on the handle bar. The rail 37 is fixed on the ends of a pair of arms 40 which are pivotally mounted upon the fulcrum pins 27. The rail 37 and the arms 40 constitute a U-sectioned yoke member to which said handle-bar may be permanently fixed if lateral adjustability of the handle-bar is not required.

Means are provided to enable the boom arms 26 to be rigidly secured to the yoke member 37, 40. To enable handle height adjustment these means preferably consist of crossing lines of bolt holes 41 into selectively registered pairs of which fixing bolts 42 may be inserted.

A tillage depth adjustment lever 43 is fulcrumed on the boom at 44. A link 45 has its ends respectively pivotally connected to the lever 43 (at 46) and to a rotor cover 47 fixed to and (as previously defined herein) forming part of the machine frame. The link 45 may be connected directly to the cover 47 or indirectly by way of a lug 48 fixed on the cover. The cover 47 (shown in Fig. 2) is centrally gapped or slotted so that in its rising or lowering movements, mechanical clearance is conventionally provided between it and the boom portion 23 including the mounting thereon for the caster wheel 24.

The boom 23 has a notched quadrant bar 49 fixed thereon, engageable by a spring-loaded plunger pawl 50. The pawl is equipped with a common operating handpiece 51 as well understood. To restrain sideward departure of the lever 43 from the quadrant bar, the said lever has a keeper plate 52 thereon to embrace the quadrant bar on its face opposite to that upon which the lever 43 is disposed.

We claim:

1. A cultivator comprising a forward part including a machine frame, earth working tools mounted upon the rear end of said frame, and a pair of coaxial land wheels upon which said frame is carried and about the axis of which said frame is rotatably movable; a rear part which is angularly movable relative to said forward part and which includes a support boom and a handle-bar both pivotally mounted by their forward ends on said frame about a common transverse axis, and means for holding said boom and said handle-bar in fixed angular relationship comprising, a pivot connection enabling lateral angular adjustment of said handle-bar relative to said boom, and clamping means for fixing said handle-bar to said boom in selected lateral angular adjustment relative thereto; and connective means between said forward part and said rear part for holding said parts in selected angular adjustment.

2. A cultivator according to claim 1 wherein said connective means comprise a rearwardly extending tillage depth adjustment lever fulcrumed by its forward end on said boom, a link pivotally connected to said lever and to said frame, and means for holding said lever in selected angular adjustment relative to said boom.

3. A cultivator according to claim 2 wherein said means for holding said lever in selected angular adjustment relative to said boom comprise, a notched quadrant bar on said boom, a spring-loaded plunger pawl positioned on said lever for engagement with said quadrant bar, and means for operating said plunger pawl.

4. In a cultivator according to claim 1 wherein said boom and said handle-bar are mounted for independent pivotal movement about said common transverse axis, whereby said boom and said handle-bar may be moved into selected vertical angular adjustment relative to each other, and clamping means for fixing said handle-bar to said boom in selected vertical angular adjustment relative thereto.

5. A cultivator according to claim 1 wherein said clamping means comprises an arcuate rail mounted on said boom, and a clamping device on said handle-bar and engageable with said rail to clamp said rail to said handle-bar.

6. A cultivator comprising a machine frame, earth working tools mounted upon the rear end of said frame, and a pair of coaxial land wheels upon which said frame is carried and about the axis of which said frame is rotatably movable, a transverse pivot member mounted upon the rear end of said frame, a support boom mounted at its forward end upon said pivot member, a handle-bar mounted at its forward end on said pivot member for pivotal movement about said pivot member independent of said support boom, means for clamping said handle-bar to said boom in selected vertical angular adjustment relative thereto, and means for maintaining said support boom in selected vertical angular adjustment relative to said earth working tools.

7. A cultivator comprising a forward part including a machine frame, earth working tools mounted upon the rear end of said frame, and a pair of coaxial land wheels upon which said frame is carried and about the axis of which said frame is rotatably movable; a rear part which is angularly movable relative to said forward part and which includes a support boom and a handle-bar both pivotally mounted at their forward ends on said frame for movement about a common transverse axis, a yoke member pivotally mounted on said frame about the same axis about which said boom is pivotally mounted on said frame, means for fixing said yoke member in selected vertical angular adjustment relative to said boom, and clamping means for clamping said handle-bar to said yoke member in selected lateral angular relationships relative thereto.

8. A cultivator comprising a forward part including a machine frame, earth working tools mounted upon the rear end of said frame, and a pair of coaxial land wheels upon which said frame is carried and about the axis of which said frame is rotatably movable; a rear part comprising a boom and handle-bar mounted upon said frame by a pivot connection, said pivot connection comprising a first fulcrum bracket fixed to said frame, first pivot means pivotally supporting said boom on said first bracket, a second fulcrum bracket pivotally mounted by said first pivot means upon said first fulcrum bracket, second pivot means pivotally supporting said handle-bar upon said second bracket for lateral angular movement relative to said boom, a yoke member comprising two side arms and an arcuate rail secured to said arms at the rear ends thereof, said side arms being pivotally connected at their forward ends to said first fulcrum bracket by said first pivot means for vertical angular movement relative to said boom, means for fixing said yoke member in selected vertical angular adjustment relative to said boom, and means for clamping said handle-bar to said arcuate rail in selected lateral angular adjustment relative thereto.

(References on following page)

References Cited in the file of this patent

UNITED STATES PATENTS

| | | |
|---|---|---|
| 2,211,260 | Donald | Aug. 13, 1940 |
| 2,640,403 | Halverson | June 2, 1953 |
| 2,657,621 | Kantz et al. | Nov. 3, 1953 |

FOREIGN PATENTS

| | | |
|---|---|---|
| 338,254 | Germany | June 14, 1921 |
| 695,991 | France | Oct. 7, 1930 |
| 435,621 | Italy | May 18, 1948 |